United States Patent
McDaniel et al.

(10) Patent No.: US 12,489,152 B2
(45) Date of Patent: Dec. 2, 2025

(54) FLEXIBLE CONTINUOUS LOAD UNIT/MONITOR INTERFACE FOR BATTERY CAPACITY TESTING

(71) Applicant: Vertiv IT Systems, Inc., Huntsville, AL (US)

(72) Inventors: Thomas McDaniel, Madison, AL (US); Marc Radzikowski, Pompano Beach, FL (US); James Jones, Boca Raton, FL (US)

(73) Assignee: Vertiv IT Systems, Inc., Huntsville, AL (US)

( * ) Notice: Subject to any disclaimer, the term of this patent is extended or adjusted under 35 U.S.C. 154(b) by 178 days.

(21) Appl. No.: 18/217,682

(22) Filed: Jul. 3, 2023

(65) Prior Publication Data
US 2024/0021891 A1     Jan. 18, 2024

Related U.S. Application Data

(60) Provisional application No. 63/388,473, filed on Jul. 12, 2022.

(51) Int. Cl.
*H01M 10/42*     (2006.01)
*G01R 31/36*     (2020.01)
*G01R 31/379*    (2019.01)

(52) U.S. Cl.
CPC .... *H01M 10/4285* (2013.01); *G01R 31/3646* (2019.01); *G01R 31/3648* (2013.01); *G01R 31/379* (2019.01)

(58) Field of Classification Search
CPC .......... H01M 10/4285; G01R 31/3646; G01R 31/379; G01R 31/3648
USPC ...... 324/500, 600, 76.11, 415–430
See application file for complete search history.

(56) References Cited

U.S. PATENT DOCUMENTS

| | | | |
|---|---|---|---|
| 11,072,258 B2 * | 7/2021 | Kumar | B60L 50/60 |
| 2006/0017444 A1 * | 1/2006 | Fechalos | G01R 31/379 |
| | | | 324/433 |
| 2016/0274193 A1 * | 9/2016 | Imaizumi | G01R 31/3835 |
| 2019/0154763 A1 * | 5/2019 | Bertness | H01M 10/4207 |
| 2021/0293890 A1 * | 9/2021 | Gorrachategui | G01R 31/367 |
| 2022/0206078 A1 * | 6/2022 | Lee | G01R 31/3842 |
| 2023/0194620 A1 * | 6/2023 | Choi | G01R 31/392 |
| | | | 702/63 |

* cited by examiner

*Primary Examiner* — Huy Q Phan
*Assistant Examiner* — Trung Q Nguyen
(74) *Attorney, Agent, or Firm* — Suiter Swantz IP

(57) ABSTRACT

A battery capacity testing interface (BCTI) module may be configured to test a capacity of a battery unit, such as an individual battery or a string of batteries. The BCTI module may instruct a battery unit under test to release a controlled electrical discharge that is measured by the BCTI module. Once determined, battery capacity can provide insight into the battery life of the battery, as well as the ability of the battery to deliver a specified amount of current at a constant rate to a specified end voltage for a specified time. The BCTI module may operate with various types of battery monitors and may be employed to test various types of batteries, including lead-acid batteries and lithium-ion batteries.

13 Claims, 4 Drawing Sheets

1

FLEXIBLE CONTINUOUS LOAD UNIT/MONITOR INTERFACE FOR BATTERY CAPACITY TESTING

CROSS REFERENCE TO RELATED APPLICATIONS

The present application claims the benefit under 35 U.S.C. § 119(e) of U.S. Provisional Application Ser. No. 63/388,473, filed Jul. 12, 2022. The U.S. Provisional Application Ser. No. 63/388,473, filed Jul. 12, 2022, is incorporated herein by reference in its entirety.

TECHNICAL FIELD

The present disclosure relates generally to data flow in battery testing, and more particularly to a system and method of battery testing in multi-battery systems with various types of battery monitors and various types of batteries.

BACKGROUND

Complex electrical distribution systems, such as electrical distribution systems in computer server installations, depend on battery backup systems in the event of a power failure. The batteries within these battery backup systems are themselves prone to failure over time, and battery monitoring systems are often employed to detect when a battery has failed before a power failure event has occurred. These battery monitoring systems are often limited in their ability to detect/predict battery failure and report battery status. For example, in systems that employ large sets of individual batteries, battery monitoring systems may be limited to testing the battery unit as a whole, and not capable of testing individual batteries or strings of batteries. These limitations often reduce the accuracy of battery life predictions, and inhibit the development of automated battery monitoring and battery backup systems. Accordingly, it may be advantageous for a system to augment the functionality of current battery reporting systems.

SUMMARY

Accordingly, the present disclosure is directed to a battery capacity testing interface (BCTI) module. The BCTI module may be configured to test capacity of a battery unit, such as an individual battery or string of batteries. In one aspect of the present disclosure, the BCTI module may instruct a battery unit under test to release a controlled electrical discharge that is measured by the BCTI module. Once determined, battery capacity can provide insight into the battery life of the battery, as well as the ability of the battery to deliver a specified amount of current at a constant rate to a specified end voltage for a specified time. Advantageously, the BCTI module may operate with various types of battery monitors and may be employed to test various types of batteries, including lead-acid batteries and lithium-ion batteries.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures.

DETAILED DESCRIPTION

Figure 1:
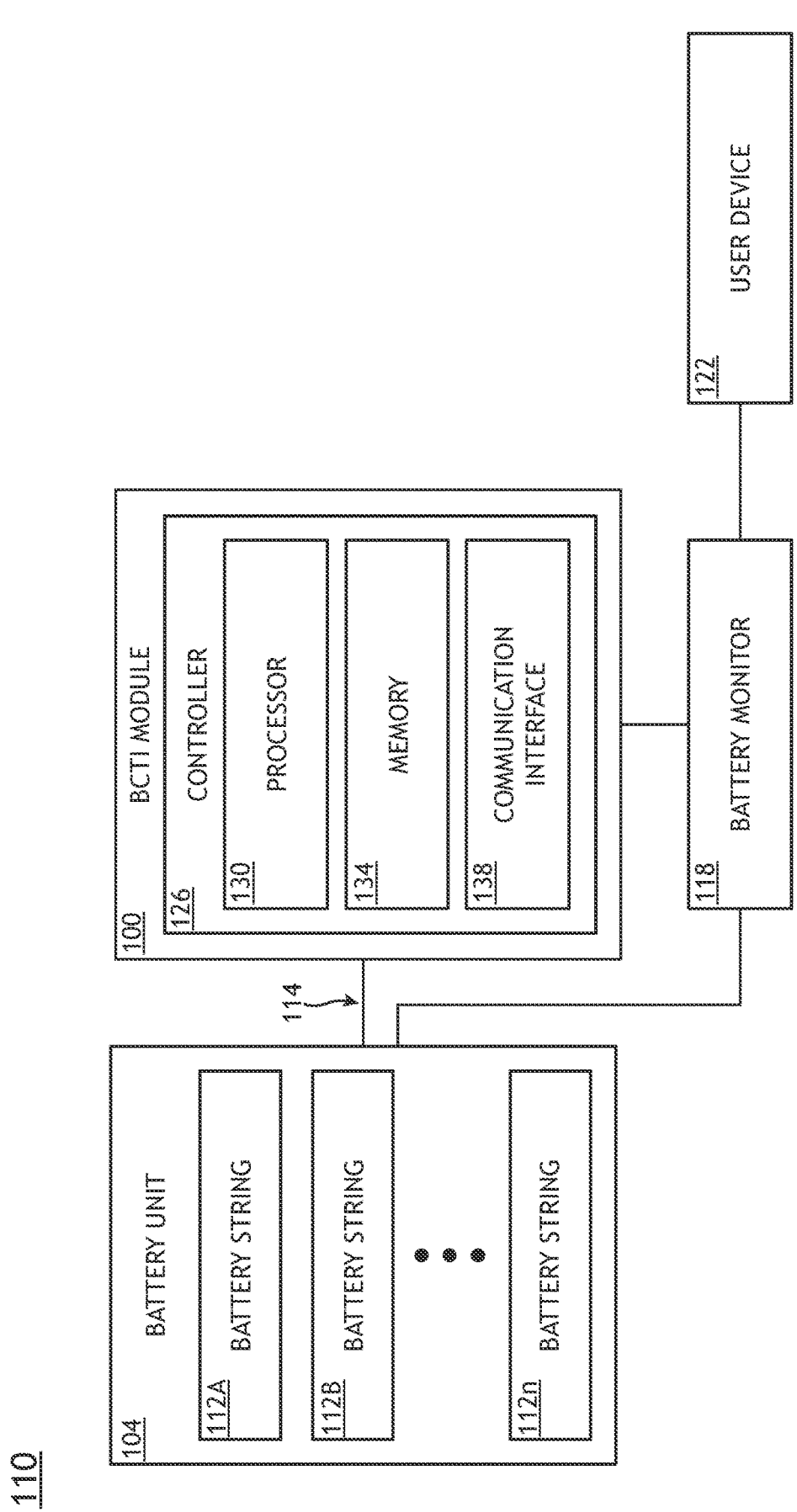
FIG. 1 is a block diagram illustrating a BCTI module, operating to monitor a battery unit within a battery backup system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "embodiments" means that a particular element, feature, structure, or characteristic described in connection with the embodiment is included in at least one embodiment disclosed herein. The appearances of the phrase "in embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

The present disclosure is directed to a battery capacity testing interface (BCTI) module. The BCTI module may be implemented as a stand-alone module (e.g., having a separate housing), or may be integrated into a battery unit and/or battery monitor. The BCTI module may be configured to test capacity of a battery unit, such as an individual battery or string of batteries. In one aspect of the present disclosure, the BCTI module may instruct a battery unit under test to release a controlled electrical discharge that is measured by the BCTI module. Battery capacity may refer to a measure of the electrical energy that a battery can store. Once determined, battery capacity can provide insight into the battery life of the battery, as well as the ability of the battery to deliver a specified amount of current at a constant rate to a specified end voltage for a specified time. Advantageously, the BCTI module may operate with various types of battery monitors and may be employed to test various types of batteries, including lead-acid batteries and lithium-ion batteries. In some embodiments, the batteries can incorporate other battery chemistries, including, but not limited to, one or more wet-cell, VLRA, or lithium-ion jars, metal-air (e.g. Ni-air) batteries, and/or other energy storage devices.

Referring to FIG. 1, a block diagram illustrating the BCTI module 100, operating to monitor a battery unit 104 within a battery backup system 110 (e.g., the system), in accordance with one or more embodiments of the present disclosure is shown. The battery backup system 110 may include or be integrated into any type of setting involving the distribution of backup electrical power. For example, the battery backup system 110 may include a server farm/cluster. In another example, the battery backup system 110 may include or be integrated into a server room or server rack within a server farm/cluster. In another example, the battery backup system 110 may include or be integrated into a server rack within a business office. In another example, the battery backup system 110 may include or be integrated into a power distribution center within a manufacturing facility.

The battery unit 104 may be configured as any type of battery or set of batteries. For example, the battery unit 104 may be configured as a continuous load unit (CLU) used for constant power or constant current applications. The battery unit 104 may include a battery or multiple sets of batteries formed of multiple cells or multicell modules connected in series to provide the requisite voltage, commonly referred to as battery strings 112$a$-$n$. Adjacent sections of a battery string 112$a$-$n$ may be connected to each other by a conductive connector. The battery unit 104 may be connected to the BCTI module 100 via a load cable 114, which allows the BCTI module 100 to receive a controlled discharge from the battery unit 104. Within this disclosure, and in the interest of clarity, the term "battery" may refer to the battery unit 104, the battery string 112$a$-$n$, and/or an individual battery cell (e.g., cell) within the battery string 112$a$-$n$.

In some embodiments, the battery backup system 110 includes a battery monitor 118 that transmits and/or receives data from the battery unit 104 and the BCTI module 100. For example, the battery monitor 118 may receive input from the battery unit 104 and the BCTI module 100, and send data, or data modified by the battery monitor 118, to a user device 122. The battery monitor 118 can capture real time data regarding the battery unit 104 and/or battery strings 112$a$-$n$ including but not limited to overall string voltage, individual cell voltages, cell/block temperatures, ambient temperature, discharge current, float current, alternating current (AC) ripple current, electrolyte level, charge cable resistance, and ground fault currents. The battery monitor 118 may be programmed to perform tests based on the input received from the battery unit 104 including but not limited to direct current (DC) resistance tests, internal cell resistance tests, intercell, interior (e.g., the cable between battery strings 112$a$-$n$), and charger cable resistance tests. A commercial example of the battery monitor 118 includes, but is not limited to, the Vertiv™ Albér™ Universal Xplorer Industrial Monitor (UXIME) vended by the Vertiv Corporation, or a different battery monitor vended by the Vertiv Corporation or a separate company. In another example, the battery monitor 118 may be configured as a battery management system (BMS) for lithium-Ion batteries or lead-acid batteries. For instance, the battery monitor 118 may be configured as a BMS vended by the Vertiv Corporation or a BMS vended by a separate company.

The user device 122 may be configured as any type of device that can receive and analyze incoming data from the battery monitor 118 including but not limited to a computer, laptop computer, tablet, smartphone, a display, or other computing device. In embodiments, the user device 122 runs configuration software that manages the tests performed by the BCTI module 100 and the battery monitor 118.

In embodiments, the BCTI module 100 may be configured to test the capacity of a battery string 112$a$-$n$ (e.g., the BCTI module 100 instructs the battery unit 104 to release a controlled electrical discharge that is measured by the BCTI module 100). Battery capacity is a measure of the electrical energy that a battery can store. Once determined, battery capacity may provide insight into the battery life of the battery, as well as the ability of the battery to deliver a specified amount of current at a constant rate to a specified end voltage for a specified time. Data obtained during the capacity test can be used to calculate the remaining life of the battery string 112$a$-$n$, and may determine weaknesses within the battery string 112$a$-$n$. In performing the capacity test, the BCTI module 100 provides functionality to the battery backup system 110 that is not performed by the battery monitor 118 or other componentry within the battery backup system 110.

The BCTI module 100 may be implemented as a stand-alone module (e.g., having a separate housing), or may be integrated into the battery unit 104 and/or battery monitor 118. For example, the BCTI module 100 can be configured as a module separate from the battery monitor 118 that adds functionality to the battery monitor 118 (e.g., by interfacing with the battery monitor 118) without requiring modification to the battery monitor 118 itself, and further be operable with any type of battery monitor 118. The BCTI module 100 may include a controller 126 configured to provide processing functionality for the BCTI module 100. The controller 126 may comprise one or more processors 130, a memory 134, and one or more communication interfaces 138.

The one or more processors 130 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 130 may include any device configured to execute algorithms and/or instructions (e.g., program instructions stored in memory 134). In one embodiment, the one or more processors 130 may be embodied as a desktop computer, mainframe computer system, workstation, image computer, parallel processor, networked computer, or any other computer system configured to execute a program configured to operate the BCTI module 100, as described throughout the present disclosure. Moreover, different subsystems of the battery backup system 110 may include a processor or logic elements suitable for carrying out at least a portion of the steps described in the present disclosure.

The memory 134 can be an example of a tangible, computer-readable storage medium that provides storage functionality to store various data and/or program code associated with operation of the controller 126 and/or other components of the BCTI module 100, such as software programs and/or code segments, or other data to instruct the controller 126 and/or other components to perform the functionality described herein. Thus, the memory 134 can store data, such as a program of instructions for operating the BCTI module 100 or other components. It should be noted that while a single memory 134 is described, a wide variety of types and combinations of memory 134 (e.g., tangible, non-transitory memory) can be employed. The memory 134 can be integral with the controller, can comprise stand-alone memory, or can be a combination of both. Some examples of the memory 134 can include removable and non-removable memory components, such as a programmable logic device, random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 138 may be operatively configured to communicate with components of the controller 126 and other components of the BCTI module 100. For example, the communication interface 138 can be configured to retrieve data from the controller 126 or other components, transmit data for storage in the memory 134, retrieve data from storage in the memory 134, and so forth. The communication interface 138 may also be communicatively coupled with the controller 126 and/or system elements to facilitate data transfer between system components.

It should be understood that other components of the battery backup system 110 (e.g., the battery unit 104, the battery monitor 118, and the user device 122) also include controllers 126 with respective processor 130, memory 134, and communication interface 138 to perform the processive functions as described herein. For example, the battery unit 104 may include controllers that control the discharge of power, detection of power levels, and other power characteristics within the battery unit 104, and communications between the battery unit and the BCTI module 100 and/or battery monitor 118. In another example, the battery monitor 118 may include controllers that control communications between the battery monitor 118 and the battery unit 104, the BCTI module 100, and/or the user device 122, with the battery monitor 118 further performing various calculations based upon received signals/data. In another example, the user device 122 may include controllers that control communications between the user device 122 and the battery monitor 118, as well as execute software (e.g., configuration software) in order to manage the functions of the battery unit 104, the BCTI module 100, and the battery monitor 118, display data to a user, and receive input from the user.

Figure 2:
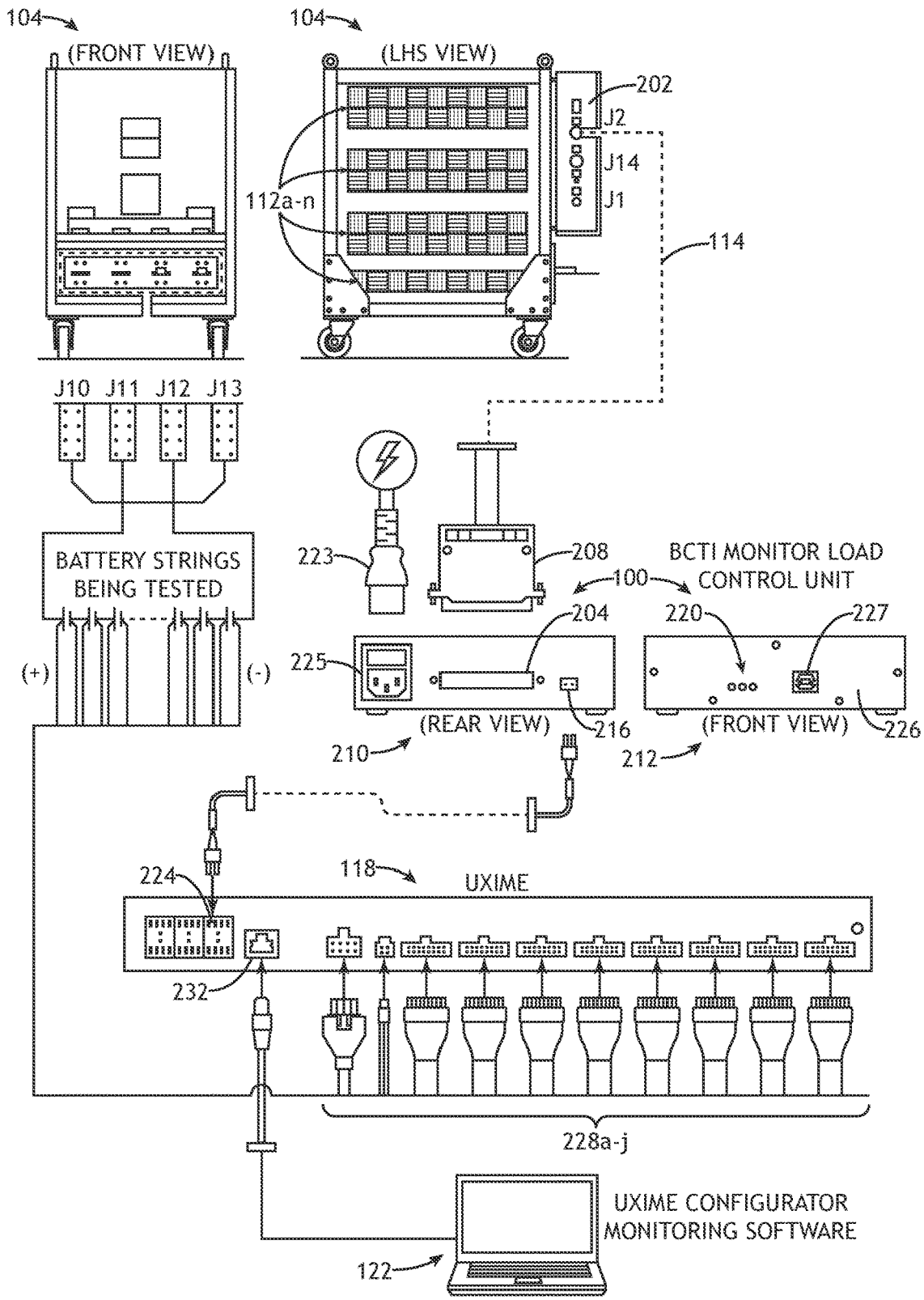
FIG. 2 is a detailed diagram illustrating a BCTI module and other components of a battery backup system, in accordance with one or more embodiments of the present disclosure.

Referring to FIG. 2, a detailed diagram illustrating the BCTI module 100 and other components of the battery backup system 110, in accordance with one or more embodiments of the present disclosure is shown. As described above, battery unit 104 may apply a controlled load across one or more battery test ports 202 based on signals from the BCTI module 100 via the load cable 114 at a load input port 204, couplable to an output plug 208 of the load cable 114 (e.g., the load input port 204 may be located on a rear panel 210 of the BCTI module 100). The BCTI module 100 then outputs a data signal to the battery monitor 118 via the data output port 216. The data output port 216 may use any type of data transfer technology including but not limited to USB, RS-485 (e.g., Ethernet), and wireless technologies. The BCTI module 100 may include a series of indicator lights 220 informing a user of the status of the BCTI module 100. For example, the indicator lights 220 may indicate to the user if the BCTI module 100 is powered up, if the BCTI module 100 is transmitting data to the battery monitor 118, and/or if the BCTI module 100 is receiving data/signals from the battery unit 104. The BCTI module 100 may be powered internally (e.g., via a battery and/or power from the test load) or externally, via a power plug 223 that plugs into a receptacle 225. Additionally, the BCTI module 100 may be powered by a rechargeable battery configured to be charged by an external source. The BCTI module 100 may include a housing 226 and a user port 227 configured to operatively couple to the user device 122.

The battery monitor 118 includes a data input 224 that receives data from the data output port 216 of the BCTI module 100. The battery monitor 118 further includes various input jacks 228*a-j* that receive signals (e.g., signals for test, or data) directly from the battery unit 104. The user device 122 sends and receives data through the user input port 232. For example, the user device 122 may receive internal cell resistance data via the user input port 232, the internal cell resistance data generated by the battery monitor 118. In another example, the user device 122 may receive battery capacity data via the user input port 232 from the battery monitor 118, the battery capacity data transmitted to the battery monitor 118 from, or derived from, the BCTI module 100. As another example, other battery performance data aside from capacity data can be sent to the user device 122. In another example, firmware may be transmitted from the user device 122 to the battery monitor 118. The user input port 232 may be configured as any type of wireline data port including but not limited to USB and RS-485 ports. In some embodiments, data is transmitted between the user device 122 and the battery monitor 118 via a wireless signal (e.g., WIFI, Bluetooth, Zigbee).

Figure 3:
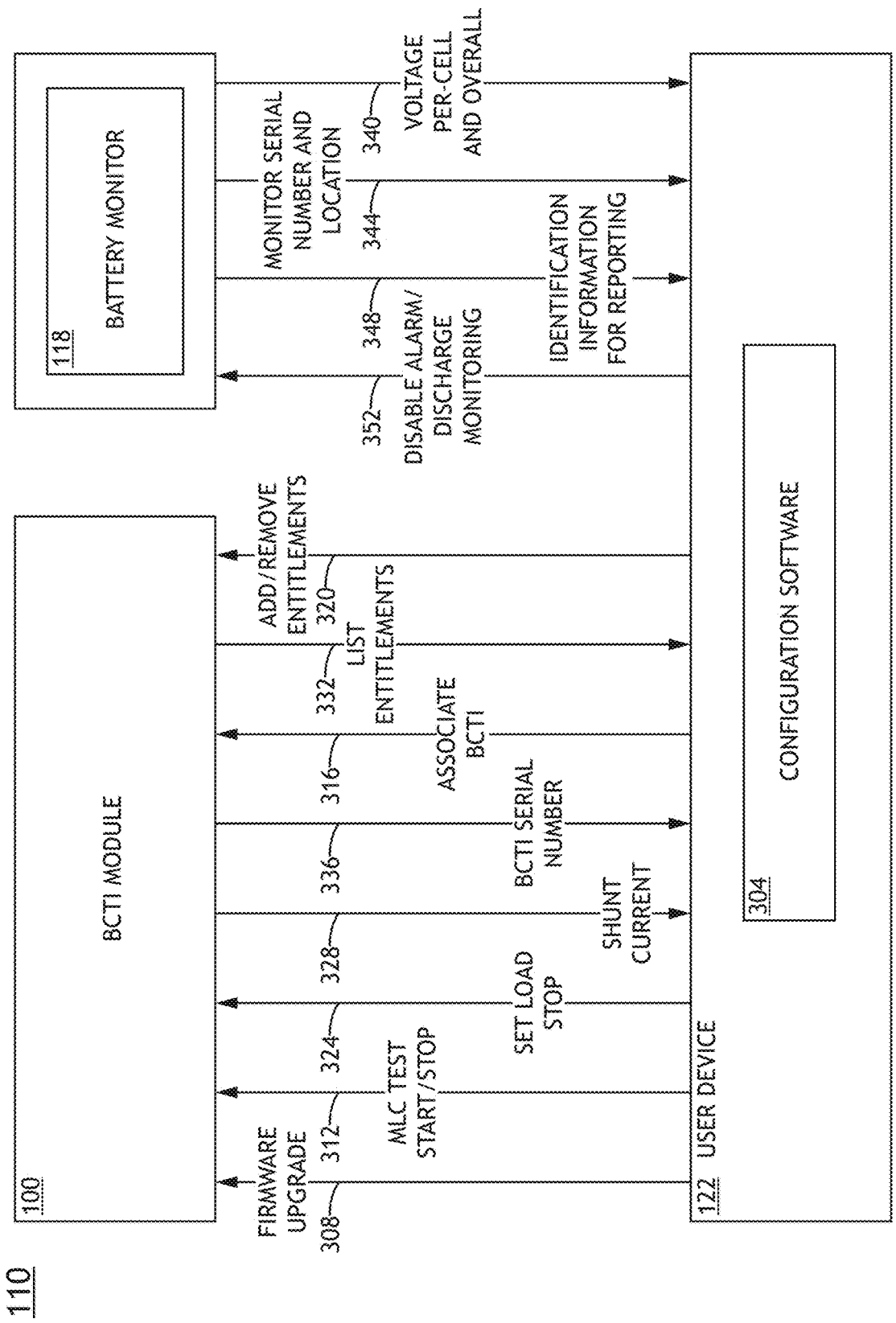
FIG. 3 is a block diagram illustrating transfer of data between components of a battery backup system, in accordance with one or more embodiments of the present disclosure.

Referring to FIG. 3, a block diagram demonstrating the transfer of data between components of the battery backup system 110 as managed by configuration software 304, in accordance with one or more embodiments of the present disclosure is shown. The configuration software 304 may be fully contained within the user device 122, or may be disseminated between the user device 122, the battery monitor 118, and/or other componentry. For example, the BCTI module 100 and the battery monitor 118 may communicate multiple data types with the user device 122, where processors within the user device 122 execute the configuration software 304, managing the flow of data to and from the user device 122. As discussed herein and demonstrated in FIGS. 1-2, the flow of data between the BCTI module 100 and the user device 122 may involve the flow of, or relay of, data to/from the battery monitor 118. The configuration software 304 may manage specific testing protocols performed by the BCTI module 100 and/or the battery monitor 118, such as the management of the battery capacity test for the battery strings 112a-n, for cells within the battery strings 112a-n, and/or for the battery unit 104 as a whole.

In embodiments, data flowing from the user device 122 to the BCTI module 100 may include firmware upgrades 308 and capacity test start/stop instructions 312. The capacity test start/stop instructions 312 are configured to prepare the battery backup system 110 for capacity testing and enables the pass-through of messages through the battery monitor 118, depending on the system configuration. Data flowing from the user device 122 to the BCTI module 100 may further include associate BCTI data 316, which associates a BCTI entitlement (e.g., policy information) with the currently connected battery monitor 118 so that battery capacity testing is enabled using specific combinations of BCTI module 100 and battery monitor 118. The BCTI module 100 supports entitlement licenses where each BCTI module 100 may be entitled to function with a set number of battery monitors 118 (e.g., as purchased by a user).

Data flowing from the user device 122 to the BCTI module 100 may further include add/remove entitlement instructions 320. For example, the add/remove entitlement instructions 320 may include an instruction to add a new entitlement to the BCTI module 100 that may later be associated with a battery monitor. In another example, the add/remove entitlement instructions 320 may include an instruction to remove an existing entitlement in the BCTI module 100 that may be expired or no longer needed. Data flowing from the user device 122 to the BCTI module 100 may further include set load stop instructions 324 which selects the level of resistance in the battery unit 104 to place across the battery string 112.

In embodiments, data flowing from the BCTI module 100 to the user device 122 includes shunt current data 328. For example, shunt current data 328 may include measurements of current as read across a shunt within the battery unit 104 (e.g., within a load bank). The shunt current data 328 may also include an instruction to reset one or more timers (e.g., a keepalive timer) used in the battery testing protocol. Data flowing from the BCTI module 100 to the user device 122 may also include an entitlement list 332 (e.g., policy information) relating to the operation of the BCTI module 100, as well as identification data 336, such as the serial number of the BCTI module 100. Data transferred to and from the BCTI module 100 may further include third-party control data and/or current transducer measurement data.

In embodiments, data flowing from the battery monitor 118 to the user device 122 includes battery power data 340 including but not limited to voltage-per-cell data, voltage-per-battery-string data, and overall voltage data (e.g., overall voltage of the battery unit 104). Data flowing from the battery monitor 118 to the user device 122 may further include monitor identification data 344 (e.g., serial numbers and location data) as well as other identification data 348 needed for reporting the battery power data 340, such the parameters and characteristics of the battery unit 104 and/or battery monitor 118. Data flowing from the user device 122 to the battery monitor 118 may include user instructions 352, such as instructions to disable alarms and/or instructions relating to the monitoring of discharges (e.g., timing of test events).

Data from the BCTI module 100 and/or battery monitor 118 may be used to determine battery capacity of the battery strings 112a-n, the cells within the battery strings 112a-n, and/or the battery unit 104. For example, the battery monitor 118 may provide the per-cell voltage and overall battery string voltage readings, and the BCTI module 100 may provide the battery string current measurement across a shunt within the battery unit 104 (e.g., within a load bank). The configuration software 304 may then be used to calculate, based on the acquired values, the resistance needed within the battery unit 104 to maintain a constant current on the battery unit 104 to control the discharge, as well as a capacity value that determines a general health of the battery unit 104, battery string 112, and/or cell. The capacity value may also be used to determine a predicted lifespan of the battery unit 104, battery string 112, and/or cell. In some embodiments, the BCTI module 100 further includes a battery unit mount that physically couples the BCTI module 100 to the battery unit 104 and/or the battery monitor 118.

Figure 4:
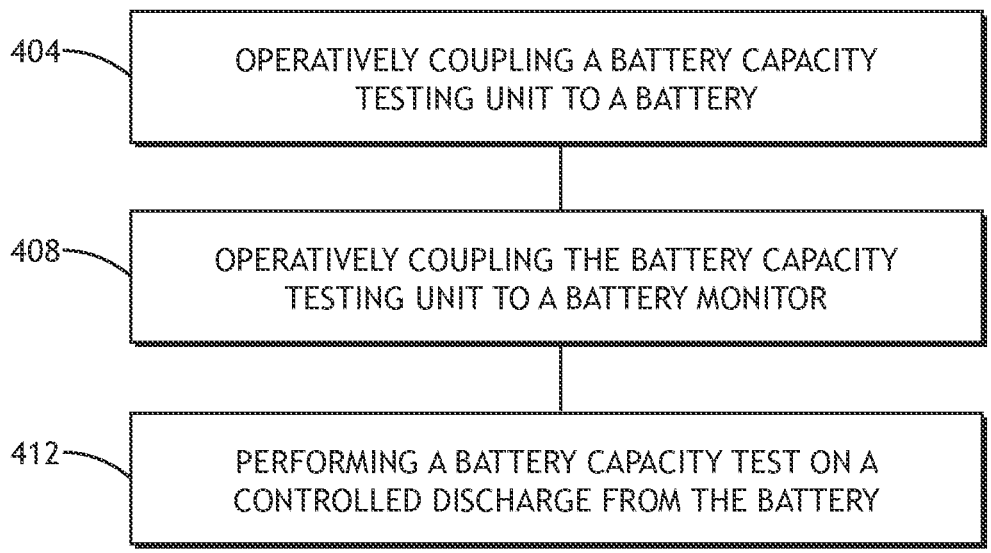
FIG. 4 is a flowchart illustrating a method for determining capacity of a battery unit, in accordance with one or more embodiments of the present disclosure.

Referring to FIG. 4, a flowchart illustrating a method 400 for determining capacity of a battery unit 104, including capacity of each battery string 112a-n within a battery unit 104, in accordance with one or more embodiments of the present disclosure is shown. The method 400 may also be used to determine the capacity of a cell (e.g., single battery) within the battery string 112a-n, or to determine the capacity of the entire battery unit 104.

In embodiments, the method 400 includes a step 404 of operatively coupling a BCTI module 100 to the battery unit 104. For example, the load cable 114 may be connected between one or more battery test ports 202 of the battery unit 104 to the load input port 204 of the BCTI module 100. The one or more test ports 202 may be configured so that one or more battery strings 112a-n are operatively coupled to a test port 202 specific for each battery string 112a-n.

In embodiments, the method 400 further includes a step 408 of operatively coupling the BCTI module 100 to the battery monitor 118. For example, a USB cord, Ethernet cord, or other data transfer cord, may be plugged into the data output port 216 of the BCTI module 100 on one end, and coupled to the data input 224 of the battery monitor 118 on the other end. The data output port 216 of the BCTI module 100 allows the BCTI module 100 to interface with several types/models of battery monitors 118.

The method 400 may include steps for connecting other componentry within the battery backup system 110, such as a step for operatively coupling the battery monitor 118 to the battery unit 104, and a step for operatively coupling the user device 122 to the battery monitor 118. In this manner, the method 400 may include the operative coupling of the BCTI module 100 to a system that already includes one or more of the battery unit 104, the battery monitor 118, and the user device 122 (e.g., the BCTI module 100 is added to an already-functioning battery backup system 110), or may include the addition of the BCTI module 100 to the battery backup system 110 as part of a newly assembled battery backup system 110.

In some embodiments, the method included a step 412 of performing a battery capacity test upon a battery string 112a-n of the battery unit 104. For example, the BCTI module 100 may transmit an instruction to the battery unit 104 to perform a controlled discharge (e.g., from a specific battery string 112a-n that is to be received by the BCTI module 100. The BCTI module 100 may then receive the controlled discharge from the battery unit 104, and generate capacity data based on the controlled discharge (e.g., via one or more processors 130). The BCTI module 100 may then transmit the capacity data to the battery monitor 118, which relays the capacity data onto the user device 122. In some embodiments, the battery monitor 118 may modify the capacity data before the capacity data is relayed to the user device 122. For example, the battery monitor 118 may perform calculations or provide data structures (e.g., time stamps, parameter data) on the incoming capacity data to produce a final capacity data set that is relayed onto the user device 122. In some embodiments, the BCTI module 100 may transmit the battery capacity data directly to the user device 122.

It is contemplated that BCTI module 100 may be implemented as a stand-alone module (e.g., having a separate housing), or may be integrated into a battery unit and/or battery monitor. Further, it is contemplated that BCTI module 100 may refer to an independently-operable unit. As such, it is contemplated that the BCTI module 100 may be referred as a BCTI module, BCTI unit, BCTI device, and the like.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed:

1. A system comprising:
    a battery capacity testing unit, comprising:
        a load input port configured to receive a controlled discharge from a battery string;
        a data output port configured to transmit battery capacity data to a battery monitor, wherein the battery capacity data comprises a battery string current measurement across a shunt of a load bank;
        a housing, wherein the housing is separate from the battery string and the battery monitor;
        one or more processors operatively coupled to the load input port and the data output port; and
        a memory with instruction stored upon, that when executed by the one or more processors, cause the one or more processors to:
            receive the controlled discharge from the load input port;
            generate the battery capacity data based on the controlled discharge; and
            transmit the battery capacity data to at least one of the battery monitor or a user device.

2. The system of claim 1, further comprising the battery string.

3. The system of claim 2, wherein the battery string comprises a lead-acid battery or a lithium-ion battery.

4. The system of claim 2, further comprising the battery monitor, wherein the battery monitor is configured to provide a per-cell voltage and a battery string voltage of the battery string, wherein the one or more processors are further configured to calculate, based on a battery string current measurement and at least one of the per-cell voltage or the battery string voltage, a predicted lifespan of the battery string.

5. The system of claim 4, wherein the battery capacity testing unit is configured to work with any type of battery monitor.

6. The system of claim 1, further comprising the user device.

7. A battery backup system comprising:
    a battery string,
    a battery monitor configured to provide a per-cell voltage and a battery string voltage of the battery string; and
    a battery capacity testing unit operatively coupled to the battery string and the battery monitor, the battery capacity testing unit comprising:
        a load input port configured to receive a controlled discharge from the battery string;
        a data output port configured to transmit battery capacity data to the battery monitor, wherein the battery capacity data comprises a battery string current measurement across a shunt of a load bank;
        a housing, wherein the housing is separate from the battery string and the battery monitor;
        one or more processors operatively coupled to the load input port and the data output port; and
        a memory with instruction stored upon, that when executed by the one or more processors, cause the one or more processors to:
            receive the controlled discharge from the load input port;
            generate capacity data based on the controlled discharge;
            transmit the capacity data to at least one of the battery monitor or a user device; and
            based on the battery string current measurement and at least one of the per-cell voltage or the battery string voltage, calculate a predicted lifespan of the battery string.

8. The battery backup system of claim 7, wherein the battery string comprises a lead-acid battery or a lithium-ion battery.

9. The battery backup system of claim 7, wherein the battery capacity testing unit is configured to work with any type of battery monitor.

10. The battery backup system of claim 7, further comprising the user device.

11. A method comprising:
    operatively coupling a battery capacity testing unit to a battery string;
    operatively coupling the battery capacity testing unit to a battery monitor, wherein the battery capacity testing unit comprises housing that is separate from the battery string and the battery monitor;
    performing a battery capacity test on a controlled discharge from the battery string, comprising:
        transmitting an instruction to the battery string to transmit the controlled discharge to the battery capacity testing unit;
        transmitting the controlled discharge to a load input port of the battery capacity testing unit;
        generating capacity data based on the controlled discharge, wherein the capacity data comprises a battery string current measurement across a shunt of a load bank; and
        transmitting the capacity data to the battery monitor;

providing at least one of a per-cell voltage or a battery string voltage of the battery string via the battery monitor; and based on the battery string current measurement and at least one of the per-cell voltage or the battery string voltage, calculating a predicted lifespan of the battery string.

12. The method of claim 11, wherein the battery string comprises a lead-acid battery or a lithium-ion battery.

13. The method of claim 11, wherein the battery capacity testing unit is configured to work with any type of battery monitor.

* * * * *